United States Patent [19]

Amamoto et al.

[11] Patent Number: 4,844,938

[45] Date of Patent: Jul. 4, 1989

[54] METHOD FOR PRODUCING ROUX

[75] Inventors: Yoshikatu Amamoto; Nozomu Tanihara, both of Nara, Japan

[73] Assignee: House Food Industrial Company Limited, Osaka, Japan

[21] Appl. No.: 139,747

[22] Filed: Dec. 30, 1987

[30] Foreign Application Priority Data

Oct. 16, 1987 [JP] Japan .................. 62-260848

[51] Int. Cl.$^4$ .......................... A23L 1/195; A23L 1/39
[52] U.S. Cl. ..................... 426/589; 426/613; 426/658; 426/622; 426/625
[58] Field of Search ............ 426/589, 613, 658, 96, 426/99, 622, 628, 524

[56] References Cited

U.S. PATENT DOCUMENTS

| | | | |
|---|---|---|---|
| 3,652,299 | 3/1972 | Penton | 426/99 |
| 3,966,993 | 6/1976 | Luck | 426/652 |
| 4,126,710 | 11/1978 | Jaworski | 426/652 |
| 4,363,824 | 12/1982 | Willi et al. | 426/589 |

FOREIGN PATENT DOCUMENTS

| | | | |
|---|---|---|---|
| 0066950 | 4/1985 | Japan | 426/589 |
| 0118157 | 6/1985 | Japan | 426/589 |
| 2130467A | 6/1984 | United Kingdom . | |

OTHER PUBLICATIONS

Ryler, Baking & Science & Tech. Siebel Pub. Co. Chicago, Ill., 1973 p. 352.
Daniel, A. Bakery Materials & Methods Maclaren & Sons Ltd. London, 1963 pp. 38–39.

Primary Examiner—Jeanette Hunter
Attorney, Agent, or Firm—Burns, Doane, Swecker & Mathis

[57] ABSTRACT

A method for producing roux by drying flour until the moisture thereof is reduced to 0.5 to 10% by weight, adding fats and oils having a melting point of not more than 55° C. in a weight ratio of flour/fats and oils being of 1/5 to 1/0.25 and then heating and mixing them at a temperature of 65° to 130° C. for 5 to 60 minutes. Another method is by drying flour to reduce the moisture content thereof to 0.5 to 10% by weight, adding fats and oils having a melting point of not more than 55° C. in a weight ratio of flour/fats and oils being 1/5 to 1/0.25, subjecting the mixture to a first heating and mixing process at 100° to 160° C. for 5 to 90 minutes, cooling, adding, seasonings, processed milk products, extracts and/or starch in an amount of from 0.3 to 4 parts by weight relative to one part by weight of the total amount of the mixture of the dried flour and the fats and oils and subjecting the resultant mixture to a second heating and mixing process.

17 Claims, No Drawings

METHOD FOR PRODUCING ROUX

BACKGROUND OF THE INVENTION

1. Field of the Invention

The present invention generally relates to roux obtained by cooking wheat flour together with fats and oils and more specifically to a method for producing roux used in a variety of sauces, soups, stews, curries and the like.

2. Description of the Prior Art

Up to now, there have been known various methods for producing roux. For example, U.S. Pat. No.4,363,824 discloses a method for producing a base for foods comprising mixing a raw powder such as wheat flour and fats and oils having a melting point of 35° to 50° C. in a weight ratio of 55/45 to 80/20, heating the mixture at 38° to 70° C. and then cooling it to 5° to 10° C. However, this method provides roux which gives off the odor of raw materials (in other words, it does not have the smell of a cooked product) since the ingredients are not heat-treated at an elevated temperature. Moreover, such roux has a problem that it turns pasty when cooked.

In addition, U.S. Pat. No.4,568,551 discloses a method comprising mixing 20 to 75% of a farinaceous material with 80 to 25% of fats and oils having a melting point of about 45° C., maintaining the mixture at a temperature of not more than 100° C., then adding 0.5 to 15% of water thereto, heating and mixing the resultant mixture at 90° to 155° C., then cooling it and further pulverizing it. U.S. Pat. No. 3,966,993 discloses a method comprising kneading, in a kneader provided with a stirrer, a mixture of 40 to 60 parts by weight of specific fats and oils melted at their melting point, i.e., about 60° C., 15 to 40 parts by weight of a cereal and 5 to 45 parts by weight of a solid seasoning until crystals of the fats and oils are formed, and then forming the mixture obtained into a solid bar under such a condition that the crystals of the fats and oils formed are not melted again. Further, U.S. Pat. No. 3,652,299 discloses a method comprising heating and mixing a mixture of 20 to 40% of specific fats and oils, 20 to 40% of a farinaceous material and 20 to 40% of a flavoring material for sauce at a temperature of not less than the melting point of the fats and oils, specifically about 75° C., and then cooling the mixture to form a solid sauce. U.S. Pat. No. 4,126,710 discloses a method comprising preparing a mixture of a particulate farinaceous material having an indigenous moisture content, and liquid fats and oils of an elevated temperature, evaporating off a substantial amount of the moisture present in the mixture to obtain dough like mixture consisting of the particulate farinaceous material covered with the liquid fats and oils of an elevated temperature, then cooling the mixture down to a temperature at which it is liquefied, and further cooling the mixture to obtain a solid mixed sauce.

However, none of the methods described above produces roux of sufficiently satisfactory performance since in such methods, the viscosity of the mixture is increased during processing of the same. This adversely affects such processing operations as transporting and charging and uneven heating of the mixture is observed during processing. Further, the resultant product gives off the odor of the raw materials and has a pasty texture and appearance.

SUMMARY OF THE INVENTION

Under such circumstances, it is industrially important to develop a new improved method for producing roux having improved performance, from the viewpoint of enhancing the commercial value of such roux.

Accordingly, it is a primary object of the present invention to provide a method for producing roux, which makes it possible to eliminate the problems of powdery or grainy texture and raw material odor and to impart a rich and well-developed flavor to the roux.

It is another object of the present invention to provide a method for producing roux, which makes it possible to impart a desired color tone such as brown to the roux and which permits the improvement of the viscosity when it is cooked and provides roux which is soft and pleasant to the palate.

The present invention has been completed on the basis of the finding that the aforementioned problems associated with the conventional methods for producing roux can effectively be solved by drying the wheat flour in advance until the moisture content thereof reaches a desired value or range and thereafter mixing the same with a specific amount of fats and oils.

Consequently, the present invention provides a method for producing roux which comprises drying flour until the moisture content thereof is reduced to 0.5 to 10% by weight, adding fats and oils having a melting point of not more than 55° C. in a weight ratio of flour to fats and oils ranges from 1/5 to 1/0.25 and then heating and mixing them at a temperature of 65° to 130° C. for 5 to 60 minutes.

According to another aspect of the present invention, there is provided a method for producing roux which comprises drying flour to reduce the moisture content thereof to 0.5 to 10% by weight, adding fats and oils having a melting point of not more than 55° C. in a weight ratio of flour/fats and oils of 1/5 to 1/0.25, subjecting the mixture to a first heating and mixing process at 100° to 160° C. for 5 to 90 minutes optionally followed by cooling, then, adding to the mixture seasonings, processed milk products, extracts and/or starch to the mixture of flour and fats and oils obtained above in an amount from 0.3 to 4 parts by weight relative to one part by weight of the total amount of the mixture of the dried flour and the fats and oils and subjecting the resultant mixture to a second heating and mixing process.

PREFERRED EMBODIMENTS OF THE INVENTION

In the first embodiment of the method according to the present invention, wheat flour having, for instance, a moisture content of 13 to 14% by weight (hereunder referred to as % for simplicity) is first dried, prior to admixing it with fats and oils, until the moisture content thereof is reduced to 0.5 to 10%, preferably 1 to 8%. In this connection, any wheat flour such as soft flour, medium flour or strong flour may be employed in the present invention. However, it becomes possible to effectively suppress the increase in viscosity during mixing with the fats and oils if a strong flour of high protein content is used.

The drying of the flour may be effected according to any method such as hot-air drying, drying under reduced pressure, lyophilization and drying under heating by a paddle of, for instance, a paddle dryer. However, it is recommendable to use a hot-air drying technique, in particular an airflow drying technique which permits the immediate reduction of the moisture content of the flour and which scarcely causes lowering of quality such as by scorching or generation of an odor due to deterioration. The hot-air drying is desirably carried out at a temperature of 80° to 200° C., and preferably 100° to 180° C. for 2 seconds to 10 minutes. The reason why the wheat flour is dried to reduce the moisture content thereof to a specific level prior to admixing the same with the fats and oils is as follows:

(1) The moisture content is reduced to a level lower than that required to cause swelling of the starch in the flour and thus the swelling thereof is suppressed. Moreover, the flour shrinks due to the drying and thus the surface area thereof is reduced, which leads to an increase in the amount of fats and oils present between the flour particles and capable of serving as a lubricating oil. For these reasons, it becomes possible to suppress the increase in the viscosity during admixing the flour with fats and oils.

(2) Because of the low moisture content of the flour, the temperature of the flour per se is rapidly raised during heating and mixing it together with the fats and oils, which enables effective heat treatment thereof. At the same time, the rapid rise of the temperature of the flour makes it possible to solve the problems of powdery or grainy texture and appearance and generation of a raw material odor. It also imparts a rich and well-developed flavor to the resultant roux.

Subsequently, to the preheated flour are added fats and oils in a weight ratio of flour to fats and oils of 1/5 to 1/0.25, preferably 1/3 to 1/0.4, and the resulting mixture is heated and mixed. In this respect, the fats and oils used herein are those having melting points of not more than 55° C., preferably 15° to 50° C. The fats and oils may be those derived from either plants or animals.

The heat treatment of the mixture is preferably effected at a temperature of 65° to 130° C. for 5 to 60 minutes in a cooker of steam jacket type, oil jacket type or direct heat type provided with a stirring means such as stirring blades. At this stage, the fats and oils preheated to 60° to 150° C., preferably 80° to 90° C., are desirably used for the purpose of shortening the time required for heating.

The heat treatment of the flour under the presence of a specific amount of fats and oils permits the elimination of the problems of the powdery or grainy texture and appearance and the generation of raw material odor, and makes it possible to impart good flavor and taste as well as a desired color tone such as a brownish color to the roux. Moreover, the viscosity characteristics of the roux during cooking the same is also improved, and roux which is soft and pleasant to the palate can be obtained.

It is recommendable to adjust the moisture content of the roux to 1 to 8% by means of this heating and mixing treatment.

According to the first embodiment of the method of this invention, the taste of the roux can further be improved by adding additives such as seasonings, processed milk products, extracts and/or starch during the foregoing heating and mixing process (hereunder referred to as the first heating and mixing process). In this case, the amount of these additives desirably ranges from 0.3 to 4 parts by weight per unit part by weight of the total amount of flour and fats and oils and particularly they are desirably used in a weight ratio, based on one part of flour, of 0.4~5 parts of fat and oils, 0~5 parts of starch, and 0.5~2 parts of other additives.

When an additive such as a seasoning is used in the first heating and mixing process in such a manner, the process is desirably effected at 90° to 120° C. for 10 to 45 minutes.

There may be used in the present invention such seasonings as common salt, sugar or sodium glutamate; such extracts as beef extract, pork extract or chicken extract; and such starches as corn starch, wheat starch or a processed starch. The use of starch permits the suppression of the increase in viscosity during heating and mixing procedure and makes it possible to impart to the final product a viscosity with in a proper range. In this case, however, it is noted that the starch should be dried beforehand if it is used as an additive. The drying of the starch is desirably effected under conditions similar to those explained above in connection with the predrying of flour. In other words, it is desirable that the moisture content thereof be reduced to 0.5 to 10%. In addition to the aforementioned various additives, other additives such as onion, vegetables and such spices as curry powder and chutney may also be used, if desired.

In accordance with the method of the present invention, the roux obtained after the heating and mixing process is then cooled. Generally, it is desirable to cool the roux to a temperature of not more than 35° C. and, for instance, the cooling operation is effected at a temperature of −30° to 15° C. for 5 to 30 minutes. More specifically, when a solid roux is produced, the roux is cooled to 50° to 70° C. in a heat-exchangeable thermo-cylinder or a jacket type or pipe-flowing type cooler followed by charging the cooled roux into a container, sealing the container and further cooling it to −30° to 15° C. to solidify the same. In producing curry flakes, the roux is cooled as in the case of the solid roux and is treated by a flaking machine to form flakes followed by charging into a container such as a packing bag and sealing of the bag. Moreover, if a paste-like curry is produced, the roux is likewise cooled to 50 to 70° C., then packed in a container and sealed.

According to the second embodiment of the method of this invention, the second heating and mixing process is effected subsequent to the aforementioned first heating and mixing process. In this process, it is desirable to establish a temperature difference between the first and the second heating and mixing processes ranging from 10° to 70° C. This is because the establishment of the temperature difference between these two processes makes it possible to impart more excellent flavor to the roux. In this respect, the first heating and mixing process may be carried out in the same manner as in the first embodiment explained above. The first heating and mixing process is preferably effected at a temperature of 100° to 160° C. for 5 to 90 minutes, whereby the flour can be properly colored (or browned) and the preferred flavor of browned materials can be imparted to the roux. Furthermore, in such case, if curry powder is added thereto during this mixing process, the coloration with curry powder may be effected and thus curry roux having a favorable coloring may be obtained.

The second heating and mixing process may be carried out immediately after the first one in which flour and fats and oils are employed or it may be effected after cooling the roux to 50° to 90° C. for not more than 15 minutes. The latter method makes it possible to prevent the deterioration of flavor of the roux due to heat inertia.

After the first heating and mixing process, ingredients other than flour and fats and oils, such as a seasoning, a processed milk product, an extract or starch is added to the product of the first process in an amount of 0.3 to 4 parts by weight per unit part by weight of the total amount of flour and fats and oils and then the second heating and mixing process is commenced. The second heating and mixing process is preferably carried out in the same apparatus as that employed in the first process and it is also preferable to carry out the second process at a temperature of 60° to 115° C. for 5 to 60 minutes. Changing the heating condition between the first and second heating and mixing processes, it becomes possible to harmonize the flavor of all the ingredients employed without impairing the flavor of the seasoning and the like, and also possible to produce a roux with a well-developed flavor. It is recommendable that the second heating and mixing process be effected so that the moisture content of the resulting roux is reduced to 0.5 to 10%.

Subsequent to the second heating and mixing process, the roux is cooled in the same manner as in the first embodiment to form desired final products.

Thus, according to the method of this invention, there can reliably be provided a roux as the final product which exhibits no powdery or grainy texture or appearance and does not give off the odor of the raw materials and has a favorable, well-developed flavor. The method according to the present invention can provide roux having a desired color tone such as brown and improved viscosity characteristics when cooked, and which is soft and pleasant to the palate. Therefore, the method of this invention is an excellent industrial method for producing roux.

The present invention will hereunder be explained more specifically with reference to the following working Examples. However, it should be appreciated that the present invention is not restricted to these specific Examples. Moreover, the effects practically achieved will also be discussed in comparison with Comparative Examples.

EXAMPLE 1

Raw flour having a moisture content of 14% was subjected to hot-air drying at 150° C. for 2 minutes to obtain 20 parts by weight of flour having a moisture content of 6%. On the other hand, 11 parts by weight of corn starch having a moisture content of 13% was dried to obtain 10 parts by weight of corn starch having a moisture content of 5%. Separately, 34 parts by weight of tallow having a melting point of about 45° C. was melted in an oil jacket type cooker at 80° to 90° C. and then the following ingredients were added thereto and the resulting mixture was heated and mixed until the moisture content thereof was reduced to 3.5%.

| Ingredient | Amount (parts by weight) |
|---|---|
| Dried Flour | 20 |
| Dried Corn Starch | 10 |
| Sugar | 10 |
| Common Salt | 10 |
| Sodium Glutamate | 1 |
| Curry Powder | 10 |
| Seasonings | 5 |

In the foregoing drying and mixing process, the resultant mixture was heated and mixed in a cooker provided with rotary blades rotating at 20 rpm. The jacket temperature was 150° C. (the set temperature of the oil jacket) and the procedure was continued until the temperature of the mixture reached 115° C. At this stage, the moisture content of the flour was estimated to be 5% since that of the resultant mixture was 3.5%.

Then, the mixture was transferred to a cooker with a set temperature of 25° to 30° C. for cooling the same, and was cooled until the temperature of the mixture was lowered to 55° C. After charging the mixture into a container of a desired shape, the mixture was further cooled at a temperature of −5° to 5° C. and solidified followed by sealing the container to obtain a solidified curry roux.

COMPARATIVE EXAMPLE 1

Curry roux was produced in a manner similar to that in Example 1 except that raw flour having a moisture content of 14% was used in place of dried flour. In this respect, the moisture content of the mixture prior to heating was 6% while that of the mixture after heating was 5%. From this value, the moisture content of the flour was estimated to have been reduced to 12%.

The degree of increase in temperature and the results of the viscosity measurement of the mixture obtained in Example 1 and Comparative Example 1 are summarized in the following Tables I and II. In this connection, the viscosity of the mixture was measured using a B type viscometer.

TABLE I

| | Rate of Increase in Temperature (°C.) | |
|---|---|---|
| Elapsed Time (minutes) | Example 1 | Comparative Example 1 |
| 5 | 77 | 72 |
| 15 | 97 | 88 |
| 25 | 110 | 100 |
| 30 | 115 | 104 |
| 53 | — | 115 |

TABLE II

| | Viscosity Measurement (cps) | |
|---|---|---|
| Temperature (°C.) | Example 1 | Comparative Example 1 |
| 60 | 3,000 | 20,000 |
| 80 | 6,000 | 40,000 |
| 100 | 8,800 | 24,000 |
| 115 | 7,200 | 22,000 |

As can be seen from the results summarized in Table I, the temperature of the mixture was raised to 115° C. within 30 minutes according to the present invention (Example 1) while in Comparative Example 1 it took 53 minutes for the temperature thereof to reach the same value. In addition, it was found, from the results shown in Table II, that the mixing operation could be effected under a low viscosity condition and a homogeneous mixture could easily be produced according to the method of this invention. Moreover, in the method of the present invention the mixture could be transferred to the cooling process utilizing a pump immediately after the completion of the heating procedure.

When comparing the properties of the resultant roux between those obtained in Example 1 and in Comparative Example 1, the former exhibited no deterioration of flavor, contrary to the latter, and was superior to the latter in taste.

EXAMPLE 2

38 parts by weight of raw flour having a moisture content of 14% was subjected to hot-air drying at 150° C. for 2 minutes to obtain 35 parts by weight of a dried flour having a moisture content of 7%. On the other hand, 40 parts by weight of tallow having a melting point of about 45° C. was melted in an oil jacket type cooker at 80° to 90° C. and then the following ingredients were added to the melt followed by heating and mixing treatment which was effected until the moisture content of the mixture reached 4.5%.

| Ingredient | Amount (parts by weight) |
| --- | --- |
| Dried Flour | 35 |
| Curry Powder | 20 |
| Seasoning | 5 |

In the foregoing drying and mixing process, the resultant mixture was heated and mixed in a cooker provided with rotary blades rotating at a number of revolutions of 20 rpm. The jacket temperature was 150° C. (the set temperature of the oil jacket) and the procedure was continued until the temperature of the mixture reached 130° C. At this stage, the moisture content of the flour was estimated to be 4% since that of the resultant mixture was 4.5%.

Then, the mixture was transferred to a separate cooker with a set temperature of 25° to 30° C. for cooling, and was cooled until the temperature of the mixture was lowered to 55° C. Then, the mixture was heated in another cooker for heating to about 60° C., and to the heated mixture were added 5 parts by weight of sugar, 5 parts by weight of common salt and 30 parts by weight of seasonings such as chutney and tomato powder, followed by second heating and mixing process effected at 90° C. for 30 minutes. The moisture content of the mixture after the heating and mixing process was found to be 5%.

Subsequently, a solid curry roux was produced by cooling the roux, charging it into a container, then additionally cooling and solidifying and sealing the container in the same manner as in Example 1.

The resultant curry roux gave off a favorable, wellestablished aroma originating from the cooked materials and was soft and pleasant to the palate.

EXAMPLE 3

54 parts by weight of raw flour having a moisture content of 14% was subjected to hot-air drying at 150° C. for 20 minutes to produce 40 parts by weight of a dried flour having a moisture content of 2.5%. On the other hand, 15 parts by weight of hardened palm oil having a melting point of about 42° C. was melted in an oil jacket type cooker at 80° to 90° C. and then the following ingredients were added to the melt followed by heating and mixing until the moisture content of the mixture reached 2.5%.

| Ingredient | Amount (parts by weight) |
| --- | --- |
| Dried Flour | 40 |
| Sugar | 10 |
| Common Salt | 10 |
| Powdered Milk | 10 |
| Spices | 5 |
| Seasonings | 10 |

In the foregoing drying and mixing process, the resultant mixture was heated and mixed in a cooker provided with rotary blades rotating at 20 rpm. The jacket temperature was 150° C. (the set temperature of the oil jacket) and the procedure was continued until the temperature of the mixture reached 110° C. At this stage, the moisture content of the flour was reached to 2.0% since that of the resultant mixture was 2.5%.

The mixture was then transferred to a flaking machine in which the temperature of the surface of a drum thereof was set at 15° C. and was flaked to form stew flakes.

This flaked stew had no pasty texture or appearance, and exhibited a proper, smooth viscosity and had a creamy rich taste.

EXAMPLE 4

45 parts by weight of raw flour having a moisture content of 14% was hot-air dried at 140° C. for 30 minutes to obtain 39.1 parts by weight of dried flour having a moisture content of 1%. On the other hand, 59 parts by weight of salad oil was heated in an oil jacket type cooker to 100° C. and the following ingredients were added to the heated salad oil followed by heating and mixing at 135° C. until the moisture content of the mixture was reduced to 0.5 to 0.2.

| Ingredient | Amount (parts by weight) |
| --- | --- |
| Dried Flour | 39.1 |
| Seasonings | 1.9 |

Then the mixture was once cooled to 80° C. and thereafter the following ingredients were added to 50 parts by weight of the cooled mixture followed by heating and mixing the mixture till the moisture content thereof was reduced to 4 to 3.5%.

| Ingredient | Amount (parts by weight) |
| --- | --- |
| Seasonings (e.g., beef extract, powdered tomato) | 20 |
| Spices (e.g., celery, parsley, nutmeg, laurel) | 2 |
| Sugar | 6 |
| Common Salt | 5 |
| Powdered Milk | 15 |
| Caramel | 2 |

In this case, the heating and mixing process was effected at a temperature of up to 82° C. Then, the mixture was charged into a container and the container was sealed and then cooled to obtain roux for beef stew.

The beef stew obtained by using this roux exhibited good aroma, rich taste and appropriate viscosity.

What is claimed is:

1. A method for producing roux comprising the steps of drying flour with hot air at 80° to 200° C. until the moisture content thereof is reduced to 0.5 to 10% by weight and to a level lower than that required to cause swelling of starch in the flour, adding fats and oils having a melting point of not more than 55° C. in a weight ratio of flour to fats and oils of 1/5 to 1/0.25 and then heating and mixing them at a temperature of 65° to 130° C. for 5 to 60 minutes.

2. A method according to claim 1 wherein the flour is dried until the moisture content thereof is reduced to 1 to 8% by weight.

3. A method according to claim 1 wherein the fats and oils are preheated to 60° to 150° C. prior to being added to the flour.

4. A method according to claim 1 wherein the moisture content of the roux obtained after the heating and mixing process ranges from 1 to 8% by weight.

5. A method according to claim 1 wherein seasonings, processed milk products, extracts and/or starch are further added to the mixture of the flour and fats and oils during the heating and mixing process.

6. A method according to claim 1 wherein the amount of the seasonings, the processed milk products, the extracts and/or the starch added is from 0.3 to 4 parts by weight per unit part by weight of the total amount of the flour and the fats and oils.

7. A method according to claim 1 wherein the heated and mixed roux is cooled to a temperature of not more than 35° C.

8. A method according to claim 1 wherein the heated and mixed roux is cooled at −30° to 15° C. for 5 to 60 minutes.

9. A method for producing roux comprising the steps of drying flour with hot air at 80° to 200° C. to reduce the moisture content thereof to 0.5 to 10% by weight and to a level lower than that required to cause swelling of starch in the flour, adding fats and oils having a melting point of not more than 55° C. in a weight ratio of flour/fats and oils being 1/5 to 1/0.25, subjecting the mixture to a first heating and mixing process at 100° to 160° C. for 5 to 90 minutes optionally followed by cooling, then adding, to the mixture, seasonings, processed milk products, extracts and/or starch in an amount of from 0.3 to 4 parts by weight relative to one part by weight of the total amount of the mixture of the dried flour and the fats and oils and subjecting the resultant mixture to a second heating and mixing process.

10. A method according to claim 9 wherein the flour is dried until the moisture content thereof is reduced to 1 to 8% by weight.

11. A method according to claim 9 wherein the fats and oils are preheated to 60° to 150° C. prior to adding the same to the dried flour.

12. A method according to claim 9 wherein the moisture content of the roux obtained after the first heating and mixing process ranges from 0.1 to 6% by weight.

13. A method according to claim 9 wherein the second heating and mixing process is conducted at 60° to 115° C. for 5 to 60 minutes.

14. A method according to claim 9 wherein a temperature difference ranging from 10° to 70° C. is established between the temperatures of the first and the second heating and mixing processes.

15. A method according to claim 9 wherein the roux is cooled to a temperature of not more than 35° C. after the second heating and mixing process.

16. A method according to claim 9 wherein the roux is cooled at −30° to 15° C. for 5 to 60 minutes after the second heating and mixing process.

17. A method according to claim 9 wherein the second heating and mixing process is conducted after cooling the mixture to 50° to 90° C. within 15 minutes.

* * * * *